(12) United States Patent
Hadar et al.

(10) Patent No.: US 10,740,893 B2
(45) Date of Patent: Aug. 11, 2020

(54) SYSTEM AND METHOD FOR AUTOMATED GRAIN INSPECTION AND ANALYSIS OF RESULTS

(71) Applicant: Vibe Imaging Analytics Ltd., Bnei-Brak (IL)

(72) Inventors: Ron Hadar, Capitola, CA (US); Vera Israeli, Petah Tikva (IL)

(73) Assignee: VIBE IMAGING ANALYTICS LTD., Bnei-Brak (IL)

( * ) Notice: Subject to any disclaimer, the term of this patent is extended or adjusted under 35 U.S.C. 154(b) by 0 days.

(21) Appl. No.: 16/122,853

(22) Filed: Sep. 5, 2018

(65) Prior Publication Data
US 2019/0073759 A1 Mar. 7, 2019

Related U.S. Application Data

(60) Provisional application No. 62/606,332, filed on Sep. 19, 2017, provisional application No. 62/605,957, filed on Sep. 5, 2017.

(51) Int. Cl.
| | |
|---|---|
| *G06T 7/00* | (2017.01) |
| *G06T 7/90* | (2017.01) |
| *H04N 5/33* | (2006.01) |
| *A01D 41/127* | (2006.01) |
| *H04N 5/247* | (2006.01) |
| *H04N 5/225* | (2006.01) |

(52) U.S. Cl.
CPC .......... *G06T 7/001* (2013.01); *A01D 41/1277* (2013.01); *G06T 7/90* (2017.01); *H04N 5/2258* (2013.01); *H04N 5/247* (2013.01); *H04N 5/33* (2013.01); *H04N 5/332* (2013.01); *G06T 2207/10048* (2013.01); *G06T 2207/10152* (2013.01); *G06T 2207/20072* (2013.01)

(58) Field of Classification Search
None
See application file for complete search history.

(56) References Cited

U.S. PATENT DOCUMENTS

| | | | | |
|---|---|---|---|---|
| 5,135,114 A | * | 8/1992 | Satake | B07C 5/3416 209/558 |
| 5,917,927 A | * | 6/1999 | Satake | G06T 7/0004 356/237.1 |
| 5,956,413 A | * | 9/1999 | Oste | B07C 5/3425 382/110 |

(Continued)

FOREIGN PATENT DOCUMENTS

JP  2017500739 A  8/2016

OTHER PUBLICATIONS

Bulaong, Manolito C., and Oliver C. Agustin. "Development of a Computer Vision System for Milled Rice Quality Analysis." Technical Bulletin 2.1., 2012. (Year: 2012).*

(Continued)

*Primary Examiner* — Vu Le
*Assistant Examiner* — Tracy Mangialaschi
(74) *Attorney, Agent, or Firm* — Brian R. Galvin; Brian S. Boon; Galvin Patent Law LLC

(57) ABSTRACT

A system and method for automated grain inspection and analysis of results, that inspects grains using a plurality of light spectra, analyzes the results, and produces detailed reports from the analysis.

14 Claims, 13 Drawing Sheets

(56) References Cited

U.S. PATENT DOCUMENTS

| | | | | |
|---|---|---|---|---|
| 6,100,526 | A * | 8/2000 | Mayes | G01N 21/359 |
| | | | | 250/339.11 |
| 6,421,990 | B1 * | 7/2002 | Ohlemeyer | A01D 41/127 |
| | | | | 356/328 |
| 6,646,264 | B1 * | 11/2003 | Modiano | G01N 21/359 |
| | | | | 250/339.07 |
| 2003/0063276 | A1 * | 4/2003 | Sjodin | G01N 21/359 |
| | | | | 356/326 |
| 2003/0072484 | A1 * | 4/2003 | Kokko | G06K 9/00127 |
| | | | | 382/155 |
| 2005/0085283 | A1 * | 4/2005 | Kormann | G01N 21/359 |
| | | | | 460/7 |
| 2008/0310674 | A1 * | 12/2008 | Modiano | B07C 5/34 |
| | | | | 382/100 |
| 2009/0050540 | A1 | 2/2009 | Imai et al. | |
| 2016/0078304 | A1 * | 3/2016 | Bremer | G01S 17/89 |
| | | | | 382/110 |

OTHER PUBLICATIONS

Klukas, Christian, Dijun Chen, and Jean-Michel Pape. "IAP: an open-source information system for high-throughput plant phenotyping." Plant physiology (2014): pp. 113. (Year: 2014).*

Pearson, Thomas. "High-speed sorting of grains by color and surface texture." Applied engineering in agriculture 26.3 (2010): 499-505. (Year: 2010).*

* cited by examiner

Distribution

Dimensional Information
# of kernels     141
# of whole kernels  113
% whole kernels   80.14
...

Grain type 610
| Type | % | # |
|---|---|---|
| long | | |
| medium | | |
| ... | | |
| TOTAL | | |

Color Analysis 630
| Type | % | # |
|---|---|---|
| Chalky | | |
| Black | | |
| ... | | |
| TOTAL | | |

Fig. 6

SYSTEM AND METHOD FOR AUTOMATED GRAIN INSPECTION AND ANALYSIS OF RESULTS

CROSS-REFERENCE TO RELATED APPLICATIONS

This application claims benefit of, and priority to, U.S. provisional patent application Ser. No. 62/605,957, titled "System and method for automate grain inspection and analysis of results", which was filed on Sep. 5, 2017, and also claims benefit of, and priority to, U.S. provisional patent application Ser. No. 62/606,332, titled "System, methods and applications for food safety, quality, process control and commercial grading", which was filed on Sep. 19, 2017, the entire specification of each of which is incorporated herein by reference.

BACKGROUND

Field of the Art

The disclosure relates to the field of spectral analysis, and more particularly to the field of using spectral analysis to automatically inspect and analyze grains (seeds and pulses).

Discussion of the State of the Art

Inspection of various grains (for example, various plant grains such as wheat or rice, mineral or metallic grains, or granulated or powdered substances) for various purposes such as safety or marketability is generally limited by factors such as subjectivity and speed, due to reliance on manual inspection methods. These methods also do not scale well and thus inspection is restricted to a sample group that is assumed to be an accurate representation of the entire lot, and study has shown visual inspection to have an error rate of 20-30%.

What is needed is a system and method for automated grain inspection and analysis of results, that enables rapid, precise, and consistent results to enable automation at scale that will improve food quality and safety, as well as refine commercial aspects of grain inspection such as grading, yield management, and quality control.

SUMMARY

Accordingly, the inventor has conceived and reduced to practice, a system and method for automated grain inspection and analysis of results, that inspects grains using a plurality of light spectra, analyzes the results, and produces detailed reports from the analysis.

According to a preferred embodiment, a system for automated grain inspection, comprising: a feeder to feed a limited quantity of grains to a receptacle; a receptacle to receive and spread mechanically the limited quantity of grains sufficiently to allow imaging of individual grains; a lighting system capable of illuminating the grains in the receptacle with one or more types of light within the spectrum from infrared through ultraviolet, distinguished by intensity, duration, spectra, and direction; one or more digital cameras with sufficient resolution to capture image data of the individual grains, with the set of one or more digital cameras together being capable of capturing images or video using at least one of the different types of light produced by the lighting system; and a computing device capable of receiving images or video from the at least one digital camera, and performing at least one type of analysis of the grains captured in the image or video, is disclosed.

According to another preferred embodiment, a method for automated grain inspection, comprising the steps of: feeding a limited quantity of grains to a receptacle; mechanically spreading the limited quantity of grains to enable inspection of the individual grains on the receptacle; illuminating the grains in the receptacle with one or more types of light within the spectrum from infrared through ultraviolet, distinguished by intensity, duration, spectra, and direction; capturing image data of the individual grains, with the set of one or more digital cameras together being capable of capturing images or video using at least one of the different types of light produced by the lighting system; and analyzing the captured image data of the individual grains, using a system for automated grain analysis, is disclosed.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 6 is a diagram illustrating an exemplary reporting interface window, presenting report results of automated grain inspection and analysis, according to an embodiment of the invention.

DETAILED DESCRIPTION

Figure 1:
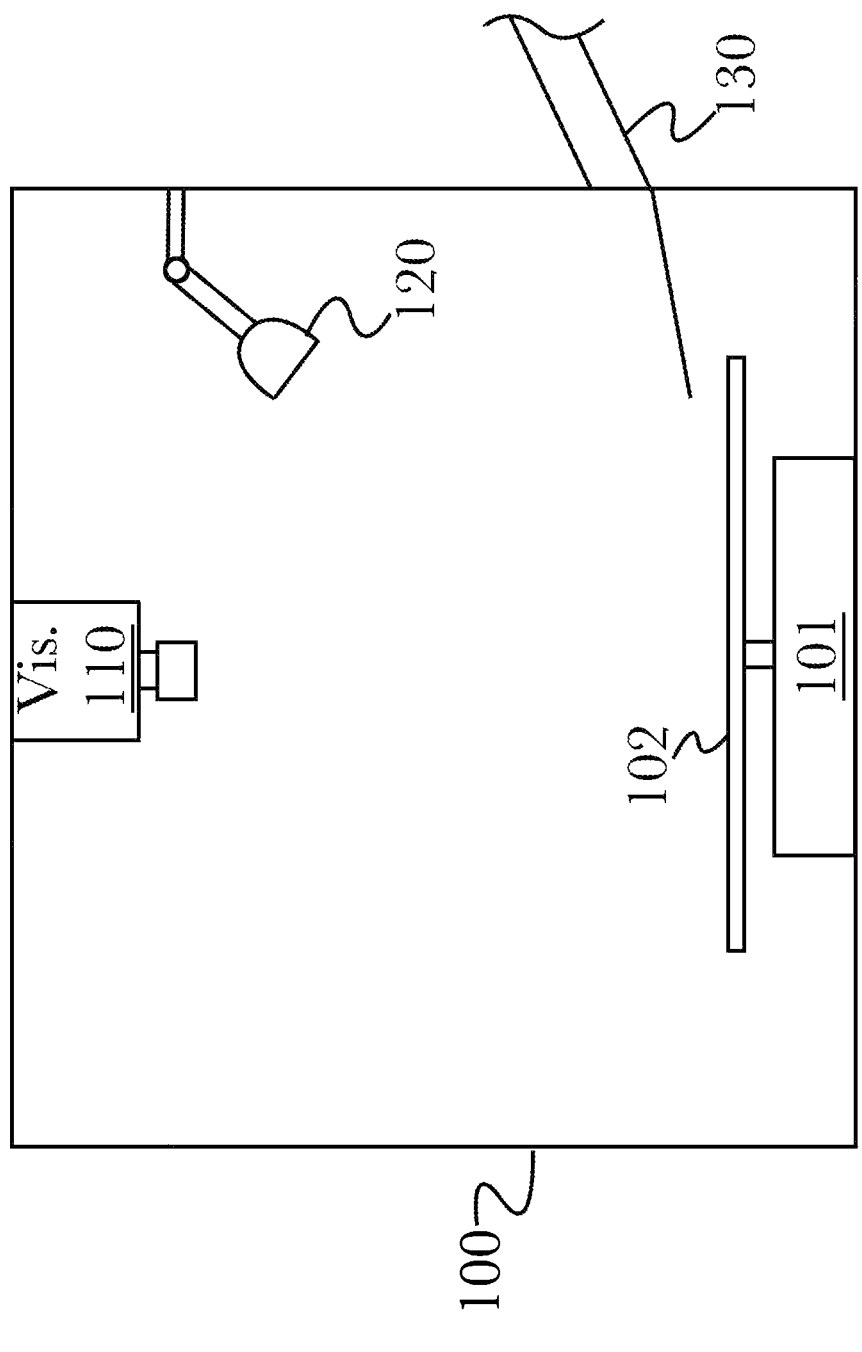
FIG. 1 is a diagram illustrating an exemplary system for automated grain inspection and analysis, according to a preferred embodiment of the invention.

The inventor has conceived, and reduced to practice, a system and method for automated grain inspection and analysis of results, that inspects grains using a plurality of light spectra, analyzes the results, and produces detailed reports from the analysis.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "grain" or "grains" includes the grains, seeds, and pulses of plants.

Conceptual Architecture

FIG. 1 is a diagram illustrating an exemplary system 100 for automated grain inspection and analysis, according to a preferred embodiment of the invention. According to the embodiment, a system 100 may comprise a feeder 130 configured to direct grains onto a receptacle 102, for example using a rigid or flexible chute 130 that is angled to control the rate of flow onto a flat or curved receptacle 102 to maintain a desired grain density on the surface of receptacle 102. This allows feeder 130 to feed a limited amount of grain to be inspected onto receptacle 102 that can spread the grain out for proper inspection, for example using mechanical means such as a vibratory motor 101 that agitates receptacle 102 to distribute grains on the surface of receptacle 102. Receptacle 102 may also be manipulated either manually or automatically to improve spreading of the grains, for example the intensity of a vibrating motor 101 may be altered automatically if the grain distribution is not within desired parameters (for example, as may be detected using an image sensor 110). A plurality of light emitters 120 may be used to project visible light onto receptacle 102 and illuminate any grains scattered thereupon, and a plurality of corresponding image sensors 110 may be used to capture image data by scanning receptacle 102 while illuminated. Optionally, light emitters 120 and imaging sensors 110 may be tuned to various wavelengths that may lie within or outside the visible spectrum (for example, infrared or ultraviolet), as is described below in FIG. 2. System 100 may be connected to a computing device or a system of computing devices, such as a network or local arrangement of computers and computing hardware, that may be configured to capture and analyze grains using the components of system 100, as described below in FIG. 3.

Figure 2:
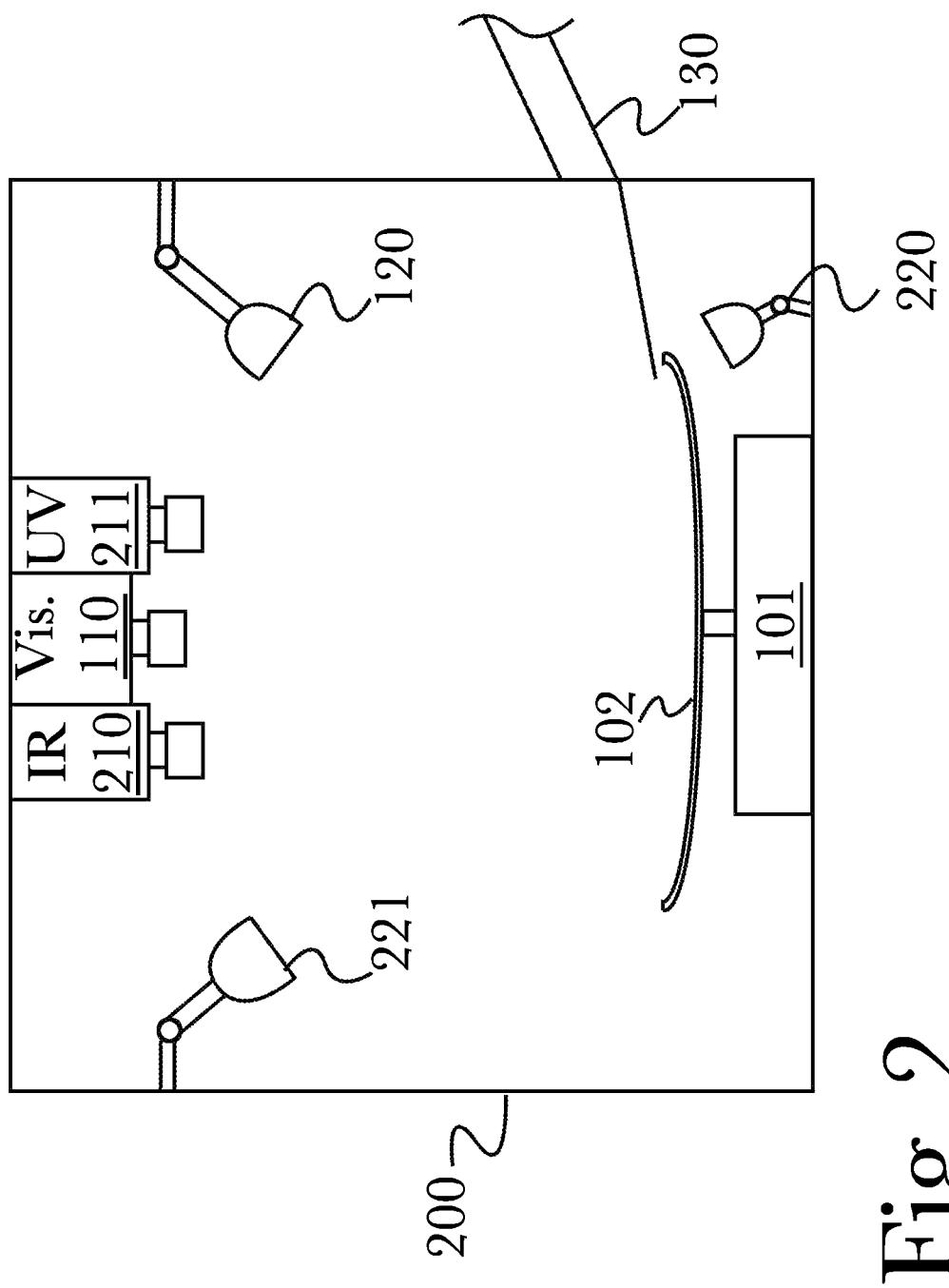
FIG. 2 is a diagram illustrating an exemplary alternative system architecture for automated grain inspection and analysis, according to another embodiment of the invention.

FIG. 2 is a diagram illustrating an exemplary alternative system 200 for automated grain inspection and analysis, according to another embodiment of the invention. According to the embodiment, a system 200 may comprise a plurality of light emitters 120, 220, 221 of different wavelengths chosen from the spectrum of light, for example ranging from infrared through ultraviolet positioned above and/or below receptacle 102 (in this embodiment, a concave receptacle is shown to illustrate an additional possible arrangement), to illuminate grains on the surface of receptacle 102 with various wavelengths of light from above and below. A plurality of corresponding images sensors may be used to scan the illuminated grains, for example sensors tuned to capture visible light frequencies 110 as described above in FIG. 1, as well as sensors configured to capture infrared (IR) 210 and ultraviolet (UV) 211. In this manner, multispectral analysis may be performed on grains to count and analyze them, providing detailed quantitative and qualitative results that may be presented in various visualizations and reports, as described below in FIGS. 4-6.

In some cases, one of the color properties assessed in particular may be a degree of chalkiness of some or all of the grains dispersed on the surface of receptacle 102, and more in particular afterglow effects of such chalkiness (for example, multispectral illumination of the grains may reveal certain spectral behaviors associated with chalkiness that may otherwise be difficult to observe, revealing details otherwise obscured in any one particular spectral band). Light emitters 120, 220, 221 may use one or more, or a combination, of LEDs of different color, or by specialized uni- or multi-spectral halide or xenon or similar discharge lamps, or other light-emitting sources, and may be configured as specialized uni- or multi-spectral lamps, and may optionally be used with any or a combination of filters to further alter the emission spectra. During sampling of grain, lights may be sequenced as needed to achieve optimal image quality or to tune for specific image or grain features, such as to highlight blemishes or examine for disease (either in general, or to examine for specific diseases or pathogens) or grain damage, or to classify grain type or variety, or to correlate with information regarding the location, methods, or other conditions of the grain's growth, harvest, storage, transport, or processing.

In addition to cameras, other sensor types may include humidity sensors, temperature sensors, light sensors, scanners, scales, or other sensor types, and the data from the sensors and cameras may be used to measure all the details of blemishes, diseases or any other damage to each grain, so the system can identify the grain type, its variety, and its diseases and damages. For each grain, a pixel count may be calculated and then organized in a histogram for color and size. These histograms may be hierarchical and may be used to identify and help quickly categorize grains, diseases, qualities, or any measurable metric.

System 100, 200 may be implemented in a combine harvester or other harvesting or farming equipment, for example diverting a sample from a harvest stream according to a configured time, location, or other schedule or pattern. This may be used to enable real-time (or near real-time) analysis of a harvest, for example to produce a harvest quality map that may be used to optimize field preparation (such as to direct the use of fertilizers or pesticides, for example) or for storage or transmission. Grain may also be classified and tracked based on harvest time, location, methods, or other such metrics, which may optionally be presented alongside analysis results in reporting.

Figure 3:
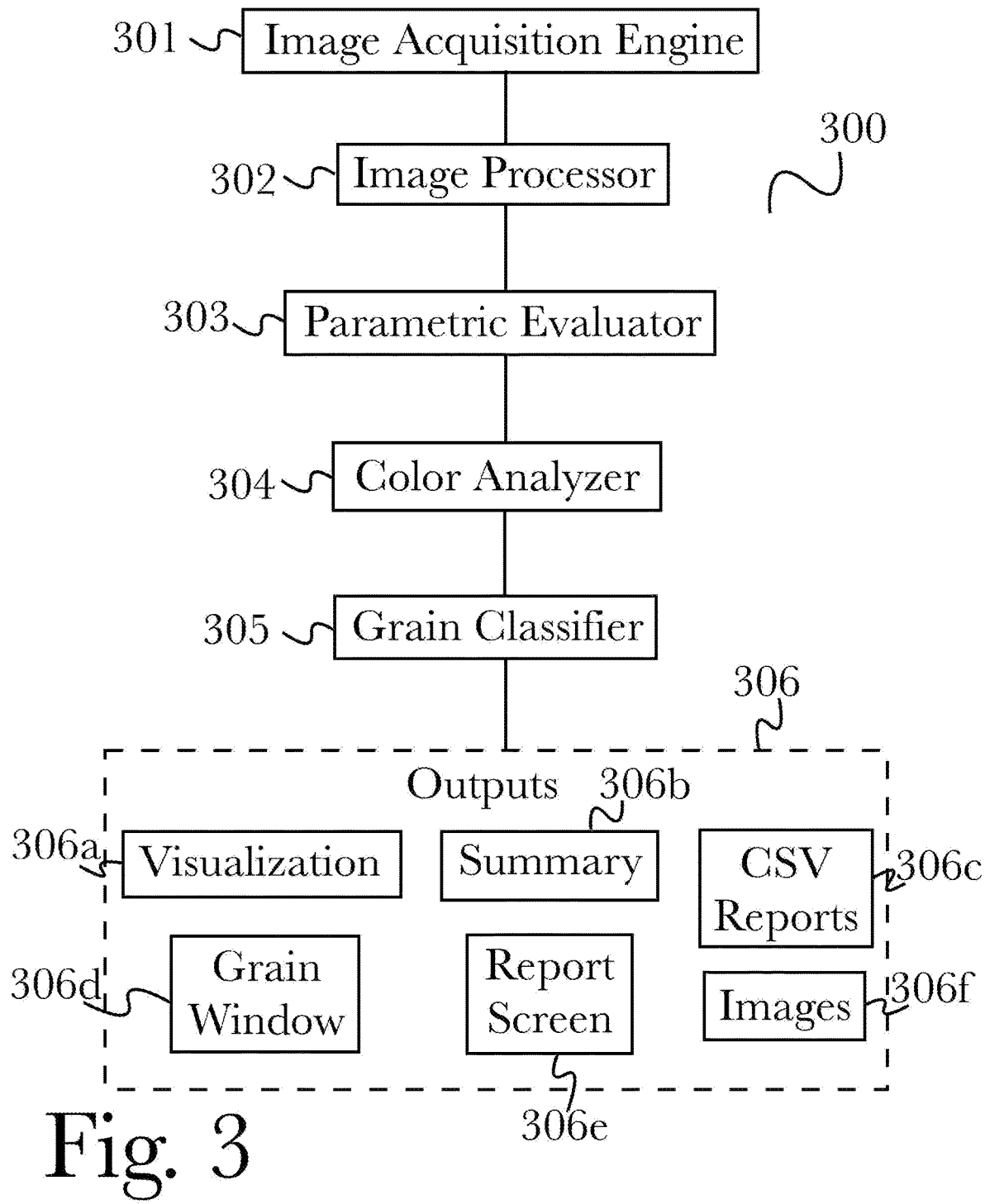
FIG. 3 is a flow diagram illustrating an exemplary logical architecture for automated grain analysis, according to another embodiment of the invention.

FIG. 3 is a flow diagram illustrating an exemplary logical architecture 300 for automated grain analysis, according to another embodiment of the invention. According to the embodiment, an image acquisition engine 301 may collect data from a plurality of image sensors 120, 220, 221 in a system for automated grain examination. Image sensor data may then be provided to an image processor 302 that may perform any or a combination of image processing tasks on the data, such as (for example, including but not limited to) normalization, amplification, color balancing, colorization, desaturation, edge-finding or erosion, or any other image processing task that may be used to improve the suitability of image information for a particular desired analysis result or operational configuration (for example, processing an image to expedite analysis or to reduce system load during parallelized operation). Processed image data may then be provided to a parametric evaluator 303 that may compare the processed data against configured parameters for analysis, for example to verify that the image data is within desired parameters for optimum results. A color analyzer 304 may then be used to analyze the color of grains within the image data, for example according to a configuration file as described below with reference to FIGS. 4-5. Color analyzer 304 may be used to calculate a pixel count that may then be organized in a histogram for color and size, and pixel counts and histograms may be arranged hierarchically and used in grain classification or visualization as described below. A grain classifier 305 may be used to classify specific grains, or a sample group as a whole, for example to apply specific labels such as size or texture identifiers or to accept/reject grains based on analysis results. For example, if a sufficient quantity of grains in a sample are below a configured quality threshold (as determined using parameter information from parametric evaluator 303 and grain color information from color analyzer 304), then a sample may be marked as unsatisfactory. A variety of outputs 306 may be produced for further review, storage, or transmission, according to various aspects and implementations. Visualizations 306a may be used to surface analysis data for human review in a readily-understood fashion, for example using color wheels (as shown below in FIGS. 4-5). A summary 306b may be provided for a concise statement of analysis results, for example for publication or quick viewing when a large number of analyses must be checked or compared quickly. CSV reports 306c may be produced for storage and import into other software applications, such as for further analysis or for storage in a database with other information (such as to maintain a repository of historical analysis results). A grain window 306d may present a view of individual grains or groups of grains for manual inspection, for example if an ambiguous result requires human intervention to validate, or to enable an additional layer of quality control by including human verification for some or all analysis operations. A report screen 306e may be produced to consolidate analysis results into a human-readable interface with various analysis factors represented for viewing, such as the exemplary interface shown below in FIG. 6. Images 306f may be produced from image data used during analysis, for example to store "raw" or original image data alongside the results of analysis of the same data, or to produce images of grain that was analyzed for publication or storage.

Figure 7:
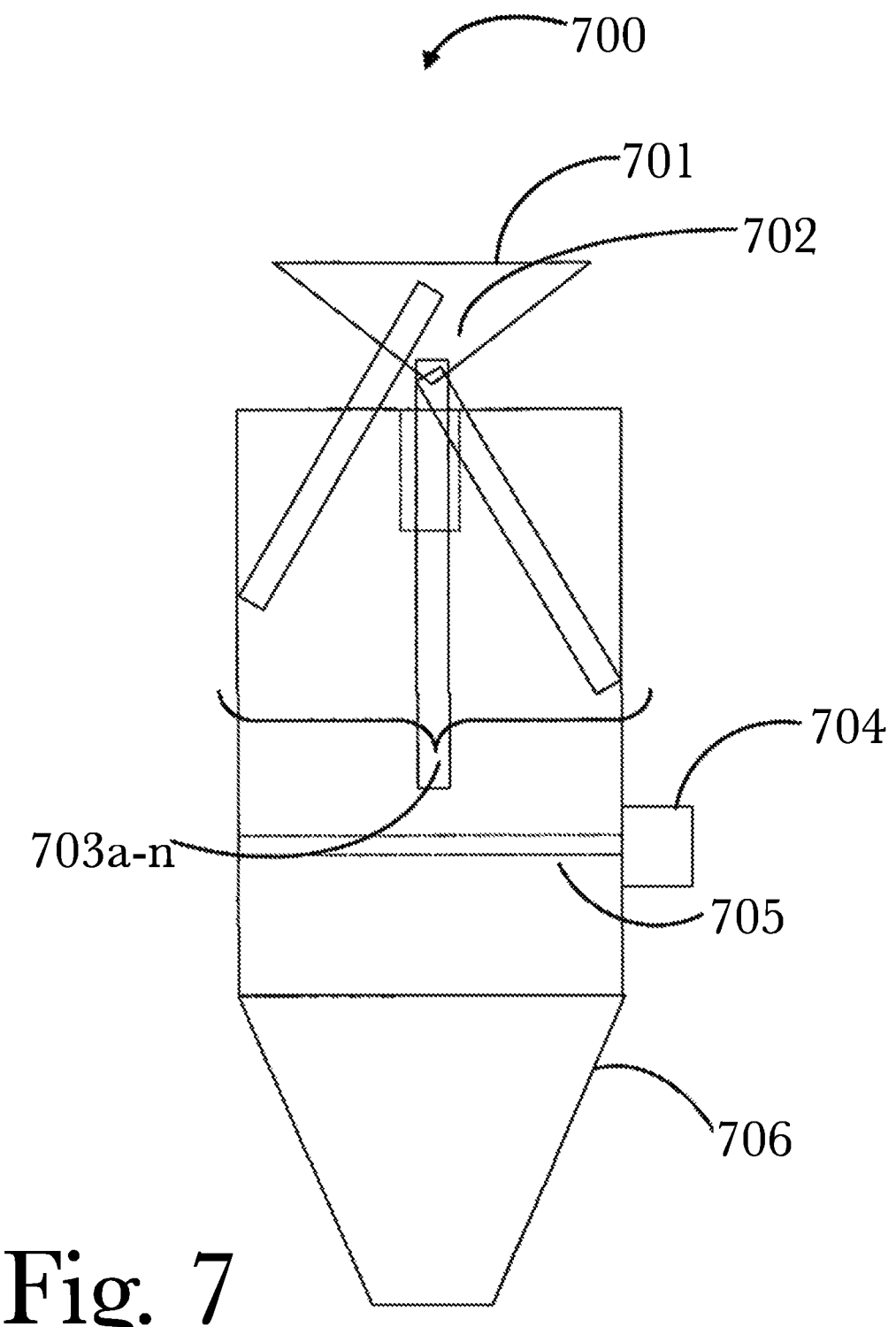
FIG. 7 shows an exemplary system for grain analysis, according to an embodiment.

FIG. 7 shows an exemplary system 700 for grain analysis, according to one aspect of the system and method disclosed herein. Inlet funnel 701 conducts grain samples via pipes 703a-n onto examination plate 705, which can rotate vertically in a full circle. Motor 704 shakes plate 705 to distribute the grains so a full sample can be captured by camera 702 for examination and analysis, as described in greater detail below. Lights (not shown here) may be installed in system 700 to illuminate grain on plate 705 during photography by camera 702. A software program on a computer, (not shown in this figure) controlling all elements, such as LEDs or other lights, motor to manipulate plate 705, etc. now analyzes the camera images of the grains, in some cases in different illuminations from the sources discussed throughout. In some cases, if the grains are too bunched up, the motor 704 that can manipulate the 705, for example by having a gear box, that when run in reverse, vibrates (if square) or turns (if round) the table horizontally rather than flip it for dumping the grains. Then the grains can be re-examined, and this may be repeated several times until a satisfactory view is achieve The grain is then dumped from plate 705 into outlet hopper 706.

Figure 8:
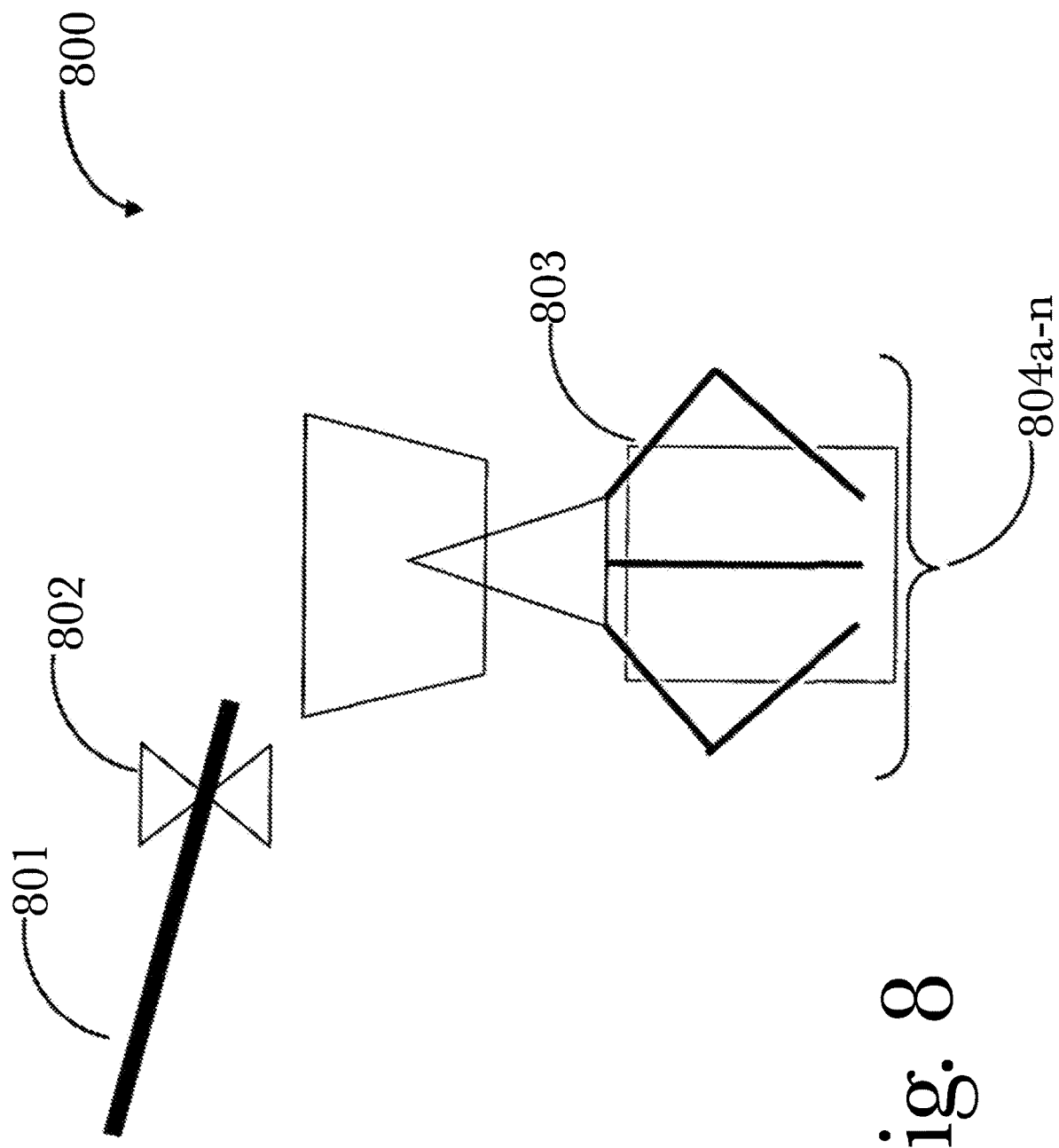
FIG. 8 shows details of an exemplary operation of the system and method disclosed herein

FIG. 8 shows details of an exemplary operation 800 of the system and method disclosed herein. Grain enters the system via pipe 801 past valve 802, which valve is calibrated to admit only a predefined weight or volume of grain into funnel 803 and thence via pipes 804a-n onto plate 805.

Figure 9:
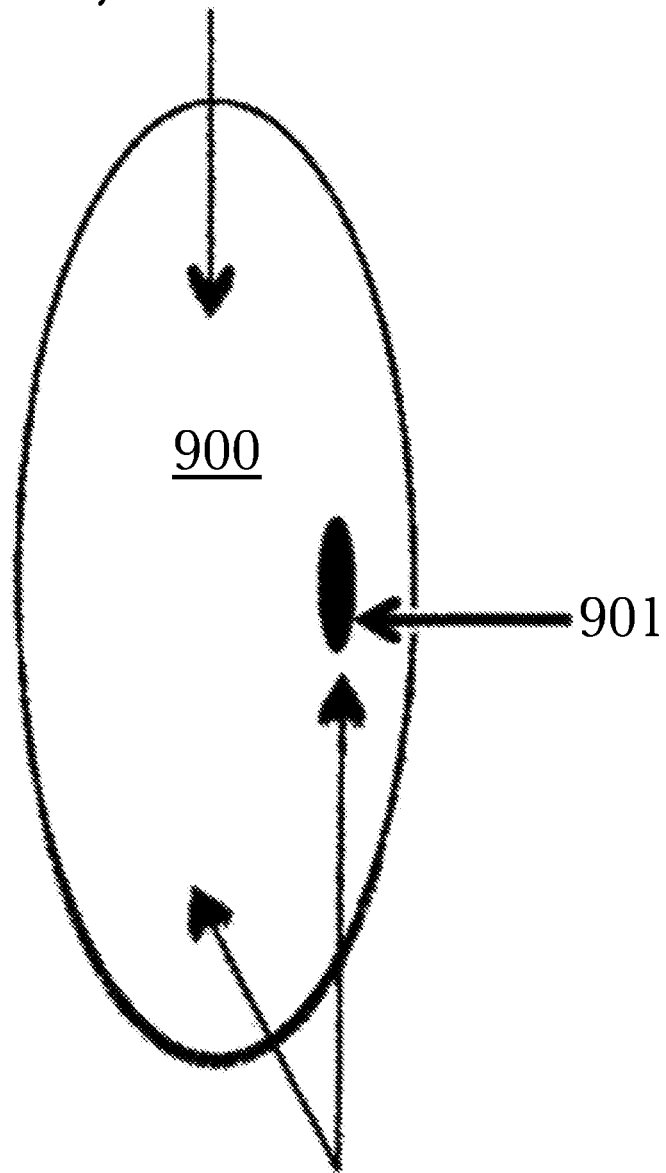
FIG. 9 shows the analysis of the area and color of a grain, according to an aspect of the invention.

FIG. 9 shows the analysis of the area and color of a grain 900, according to an aspect of the invention. According to the aspect, the total area of grain 900 may be considered to be a value of 100% of the area, while any damage to grain 900 may be defined as a percentage thereof. Grain 900 may be of a normal color according to a configured color scale, or it may be of an abnormal color either according to the color scale or based on the analysis of the % of the surface area that is an abnormal color (for example, there may be a defined color threshold above which the entire grain is deemed to be abnormal). Specific damages 901 may be identified and considered when determining if a grain is acceptable, for example by the nature or severity of the damage (such as a surface imperfection) or based on the portion of total area that is damaged (such as for color abnormalities, or cracks).

Detailed Description of Exemplary Aspects

Figure 4:
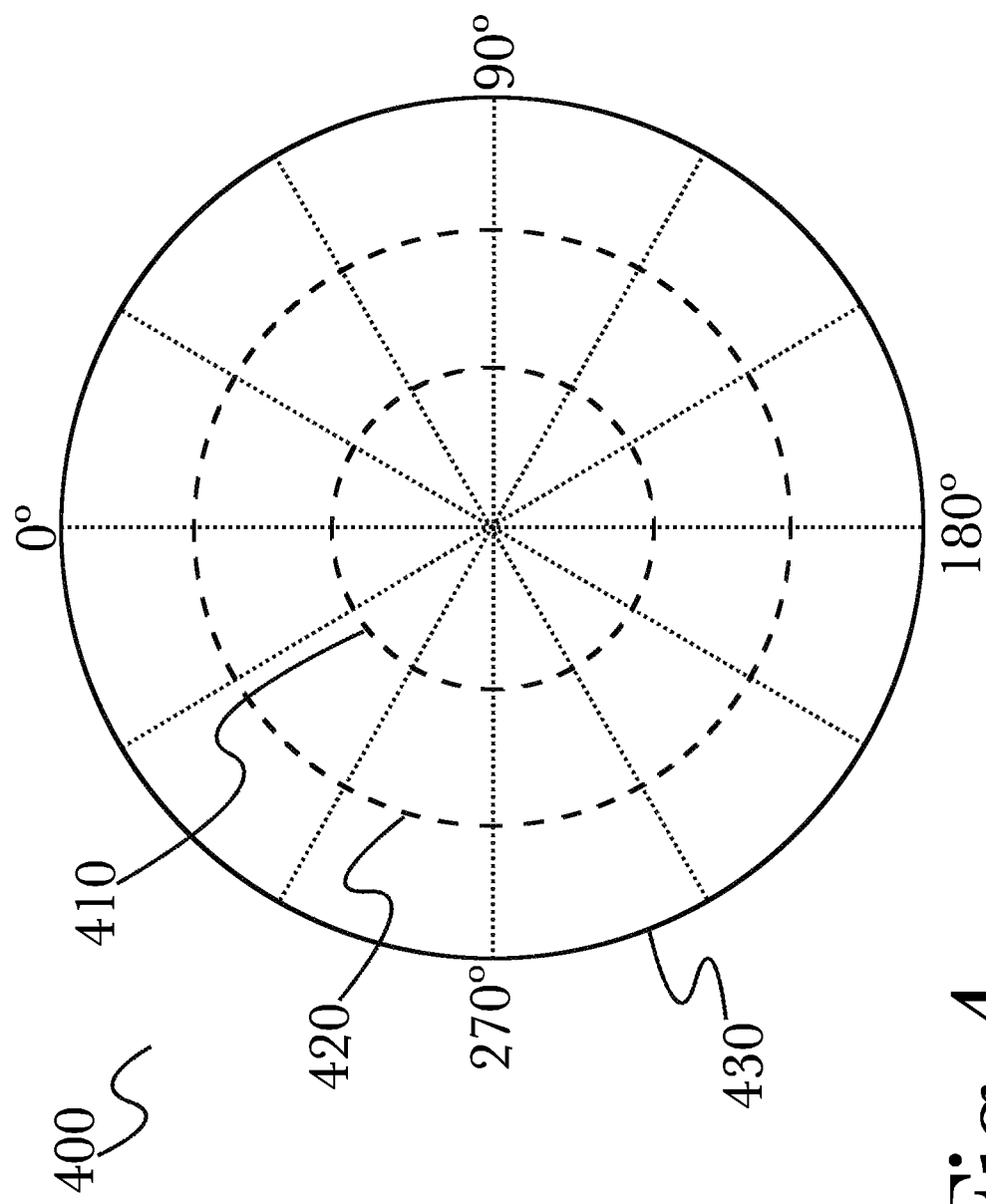
FIG. 4 is a diagram illustrating an exemplary color wheel for use in color calibration and analysis, according to an embodiment of the invention.

FIG. 4 is a diagram illustrating an exemplary color wheel 400 for use in color calibration and analysis, illustrating the use of configured zones 410, 420, 430, according to an embodiment of the invention. According to various aspects of the invention, color analyzer 304 may receive or produce a calibration file comprising configuration information that defines a plurality of color zones 410, 420, 430 on a color wheel 400, that may be used in conjunction with slices of color wheel 400 to represent color analysis points. A calibration file may be produce by scanning and analyzing a known sample of grains and fitting the calibration to the results, defining calibration values in terms of the results obtained from the use of a controlled sample that is known to produce specific values. Color zones are defined as an area covering the full 360° of the color wheel 400 out to a specified distance from the origin. For example, zone A 410 may be the area out to ⅓r (where r is the radius of the circle described by color wheel 400), zone B 420 may comprise the area from ⅓r to ⅔r, and zone C 430 may be the remaining outer area from ⅔r to r, or the outer boundary of color wheel 400. The specific values for each zone may be described in a calibration file for ease of storage and use. It should be appreciated that the specific visual arrangement shown in FIG. 4 may vary, for example orienting the color wheel with 0° at the bottom, side, or at an angle (rather than at the top as shown), or increasing the degree scale in a counterclockwise direction, rather than the clockwise direction shown, or other variations (which may be defined in a calibration file).

Figure 5:
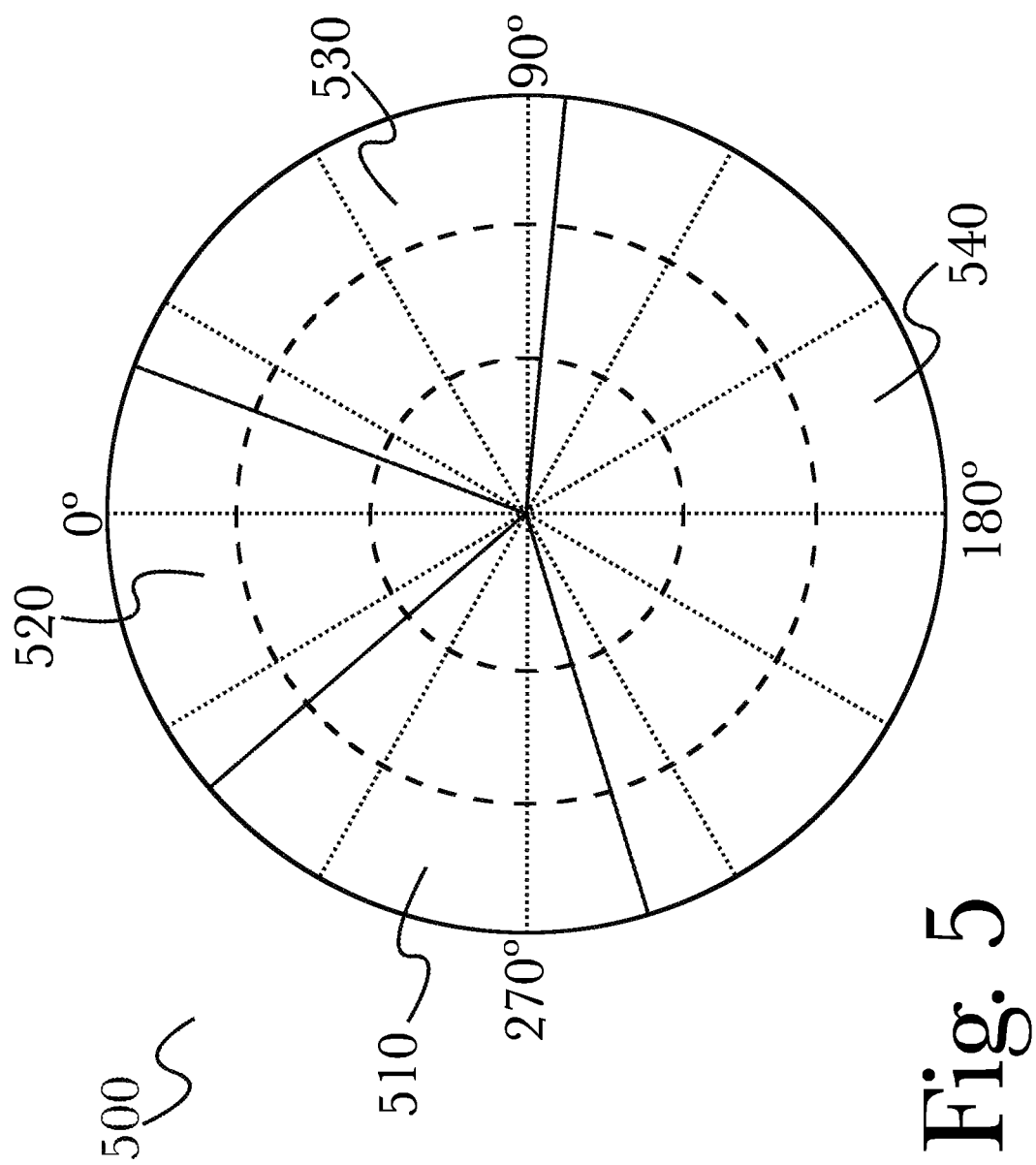
FIG. 5 is a diagram illustrating an exemplary color analysis result, according to an embodiment of the invention.

FIG. 5 is a diagram illustrating an exemplary color wheel 500 for use in color calibration and analysis, illustrating the use of configured color slices 510, 520, 530, 540, according to an embodiment of the invention. According to various aspects, color slices 510, 520, 530, 540 may be defined in a configuration file (optionally in addition to, with each slice comprising a circular sector within color wheel 500. In this manner, color analysis results may be represented as points within color wheel 500, with each point being placed within the slice and/or zone corresponding to the analysis results, producing a complete visualization for easy interpretation and further use of analysis results. This may be used both to visualize actual color (for example, when using visible-light analysis of grains, as described above in FIG. 1), as well as to visualize multidimensional data by assigning color to other data values. For example, grain size or degree of chalkiness may be represented as distance from the origin (and thus, placement within color zones 410, 411, 412) and grain density (or other metric) may be represented as a point's placement within color zones 510, 520, 530, 540. This may be particularly suitable for some visualization types, as a normal color wheel provides for easy visual indication of color hue and saturation, which may be natural analogues for certain analysis metrics such as chalkiness, size, damage, density, purity, or any of a number of metrics that may be represented on a bounded scale. Additionally, any particular visualization may have selectable or dynamically-adjustable granularity, for example to enable a zoom feature to precisely compare multiple points that may be grouped together, providing for a high-fidelity representation of information (for example, by using vectors to store pixel information rather than rounding values and thus introducing information loss).

FIG. 6 is a diagram illustrating an exemplary reporting interface window 600, presenting report results of automated grain inspection and analysis, according to an embodiment of the invention. According to the embodiment, analysis results may be collected and consolidated into a reporting interface 600 for ease of viewing, so they may be presented for verification or review by a human user or for use in publication (such as to publish analysis results of a grain sample for public viewing). Any number and combination of analysis metrics may be represented for viewing in appropriate formats, for example including (but not limited to) a list of grain types 610 that were analyzed, a list of metricized analysis results 630, a graph of grain metric distribution 620 such as color or size distribution or other metrics that may be represented in graph form, or sortable or filterable lists of grain attributes 640 such as physical dimensions. These interface views may optionally be fixed, for example as part of a loaded configuration or as part of a particular analysis operation (for example, an analysis focused on specific metrics may restrict the types of information presented for the sake of clarity), or they may be user-configurable and interactive, for example enabling drag-and-drop or other interaction so that a user may adjust the information or the presentation thereof.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Figure 10:
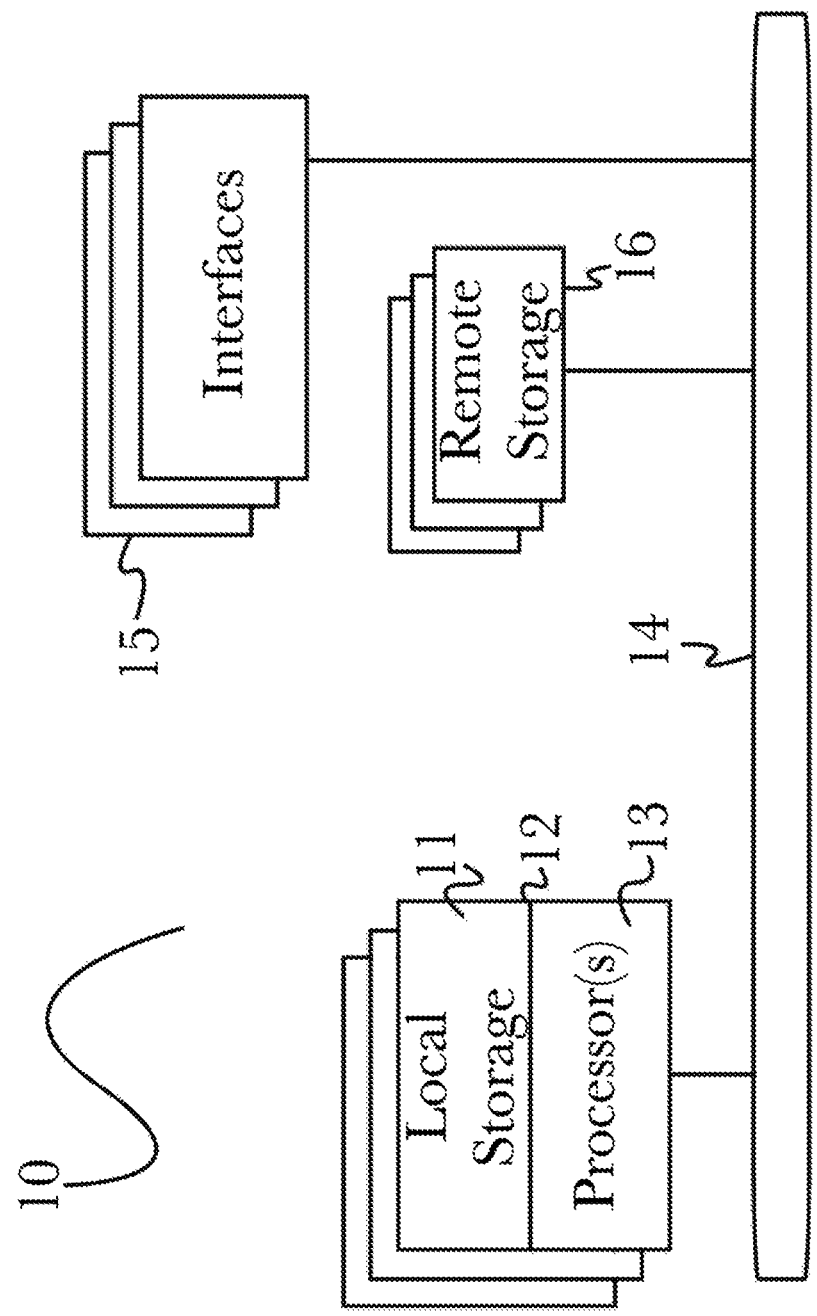
FIG. 10 is a block diagram illustrating an exemplary hardware architecture of a computing device.

Referring now to FIG. 10, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 10 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 11:
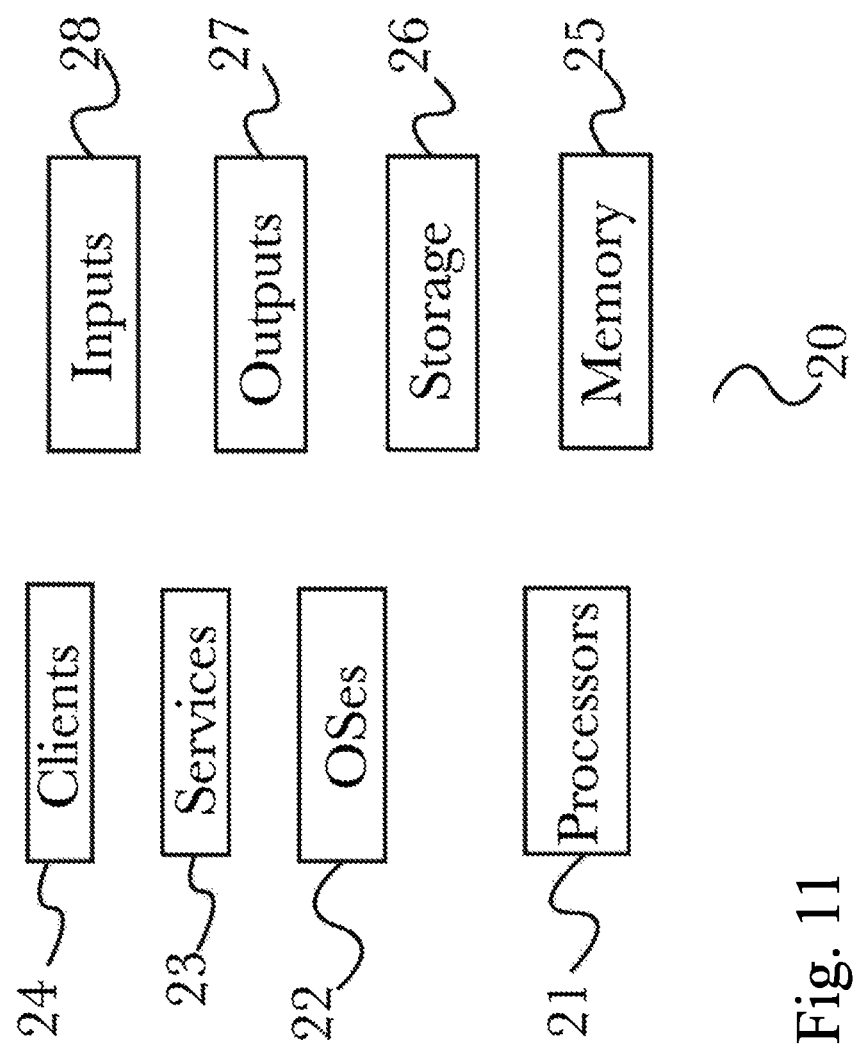
FIG. 11 is a block diagram illustrating an exemplary logical architecture for a client device.

In some aspects, systems may be implemented on a standalone computing system. Referring now to FIG. 11, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 10). Examples of storage devices 26 include flash memory, magnetic hard drive, CD-ROM, and/or the like.

Figure 12:
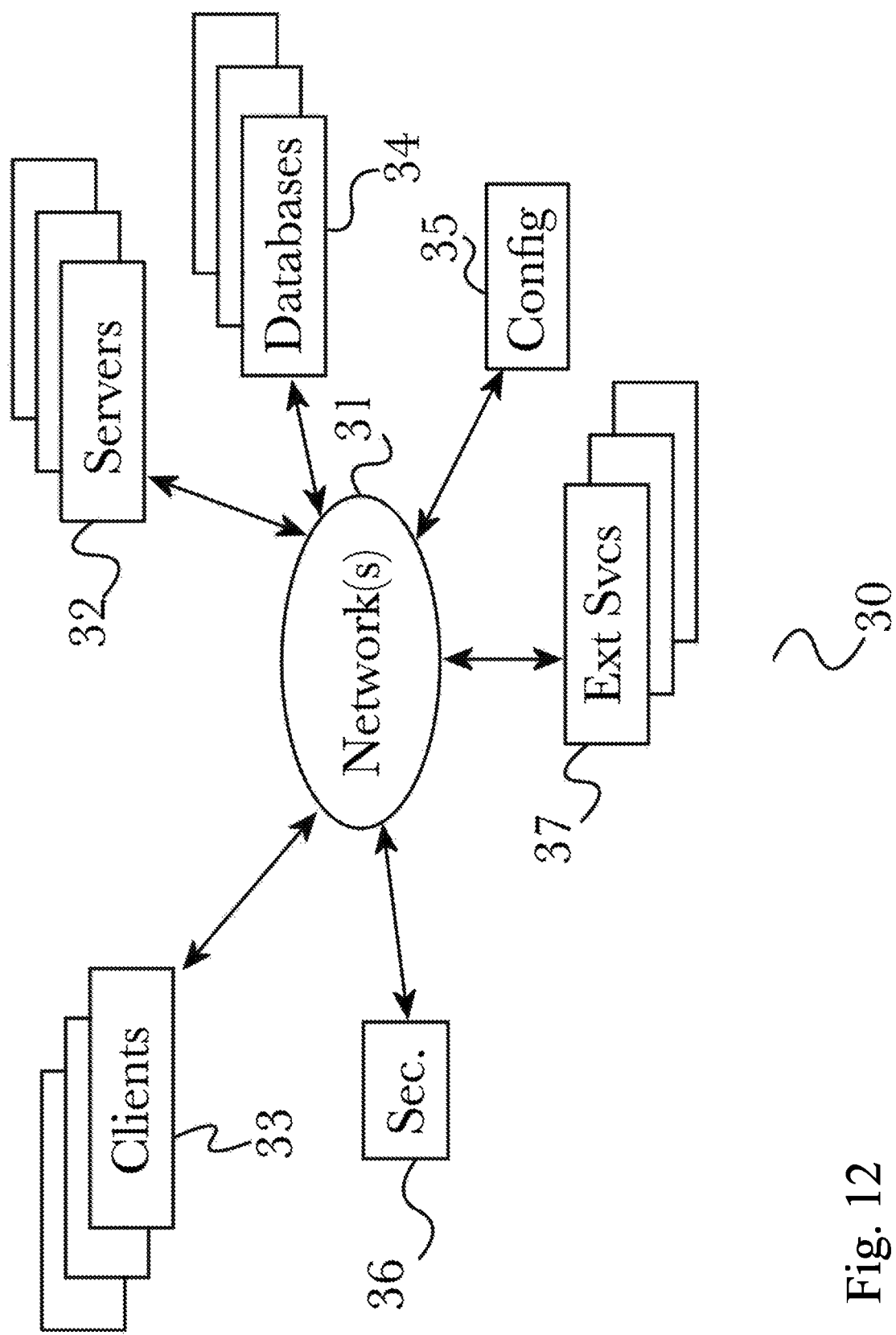
FIG. 12 is a block diagram showing an exemplary architectural arrangement of clients, servers, and external services.

In some aspects, systems may be implemented on a distributed computing network, such as one having any number of clients and/or servers. Referring now to FIG. 12, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 11. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some aspects, clients 33 or servers 32 (or both) may make use of one or more specialized services or appliances that may be deployed locally or remotely across one or more networks 31. For example, one or more databases 34 may be used or referred to by one or more aspects. It should be understood by one having ordinary skill in the art that databases 34 may be arranged in a wide variety of architectures and using a wide variety of data access and manipulation means. For example, in various aspects one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

Figure 13:
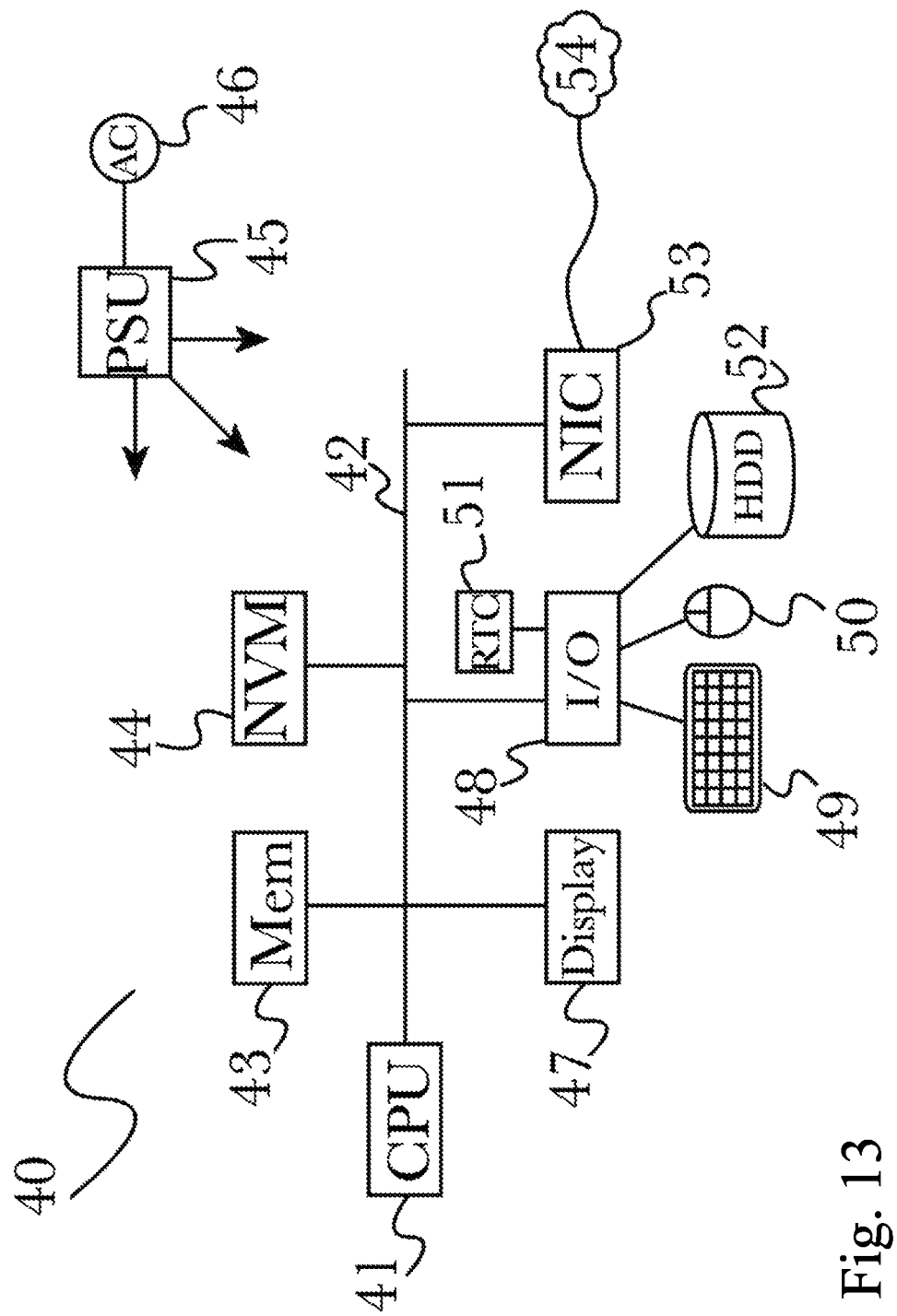
FIG. 13 is another block diagram illustrating an exemplary hardware architecture of a computing device.

FIG. 13 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:
1. A system for automated grain inspection, comprising:
a feeder to feed a quantity of grains to a receptacle;
the receptacle to receive the quantity of grains;
a lighting system configured to illuminate the grains in the receptacle with a wavelength of light from a spectrum from infrared through ultraviolet;
a digital camera configured to capture an image of the quantity of grains as illuminated by the wavelength of light produced by the lighting system, the image comprising pixels, each pixel having a color value, and the image having a resolution such that each grain of the quantity of grains is represented by a plurality of pixels;
a humidity sensor, configured to capture moisture data from air surrounding the quantity of grains; and
a computing device comprising a memory, and a processor, and configured to receive the images from the digital camera, and the moisture data from the humidity sensor;
an image processor comprising a first plurality of programming instructions stored in the memory of, and operating on the processor of, the computing device, wherein the first plurality of programming instructions, when operating on the processor, cause the computing device to:
receive the image of the quantity of grains;
identify in the image a plurality of grains of the quantity of grains;
for each of the plurality of grains identified, determine the color value of each pixel representing that grain;
create a histogram of the color values of the plurality of grains identified from the determined color values; and
a parametric evaluator comprising a second plurality of programming instructions stored in the memory of, and operating on the processor of, the computing device, wherein the second plurality of programming instructions, when operating on the processor, cause the computing device to:
receive the histogram from the image processor;
determine whether the histogram falls within an expected histogram parameter;
receive the moisture data from the humidity sensor;
determine whether the moisture data falls within an expected moisture parameter; and
if the histogram falls within the expected histogram parameter and the moisture data falls within the expected moisture parameter, indicate acceptability of the quantity of grains; and
a hierarchical histogram evaluator comprising a third plurality of programming instructions stored in the memory of, and operating on the processor of, the computing device, wherein the third plurality of programming instructions, when operating on the processor, cause the computing device to:
if the parametric evaluator has not indicated acceptability of the quantity of grains, receive the histogram from the parametric evaluator; and
compare the histogram to a hierarchy of histograms to identify an abnormality in the quantity of grains that is the cause of unacceptability.

2. The system of claim 1, wherein the receptacle can be mechanically manipulated to further spread the grains in case they are grouped too close together.

3. The system of claim 1, wherein light can come from above or below the receptacle.

4. The system of claim 1, wherein light can be generated either by one or more LEDs of different color, or by specialized uni- or multi-spectral halide or xenon or similar discharge lamps, or by any other suitable combination of light sources, with or without additional external filters.

5. The system of claim 1, wherein during capture of image data of the grains with the camera, the lights can be sequenced as needed by software in the computing device to optimize the image.

6. The system of claim 1, wherein the system is implemented in a combine or other harvesting system in such a manner as to be usable while the combine or other harvesting system is in operation.

7. The system of claim 1, wherein the pixel color values are used to measure dimensions and colors of each grain, enabling the system to identify the grain type and its variety.

8. The system of claim 7, wherein the pixel color values are further used to measure the colors of blemishes, and identify diseases in, damage to, or imperfections in, each grain.

9. The system of claim 1, wherein the histogram includes both color value and size data.

10. The system of claim 9, wherein histograms for color value and size are hierarchical and used to identify and help quickly categorize grains and their quality.

11. The system of claim 9, wherein one of the histogram color properties assessed in particular is the degree of chalkiness, and in particular afterglow effects of chalkiness.

12. The system of claim 9, wherein the histogram information is sent over a network to a server or a cloud, and compared to a reference database.

13. The system of claim 9, wherein changes in histogram information over time are tracked by the source region of the grain.

14. A method for automated grain inspection, comprising the steps of:

feeding a quantity of grains to a receptacle;
illuminating the grains in the receptacle with a wavelength of light from a spectrum from infrared through ultraviolet;
capturing an image of the quantity of grains as illuminated by the wavelength of light produced by a lighting system, the image comprising pixels, each pixel having a color value, and the image having a resolution such that each grain of the quantity of grains is represented by a plurality of pixels;
capturing moisture data from air surrounding the quantity of grains using a humidity sensor;
using a computing device comprising an image processor, a parametric evaluator, and a hierarchical histogram evaluator to:
  receive the image of the quantity of grains at the image processor;
  identify in the image a plurality of grains of the quantity of grains;
  for each of the plurality of grains identified, determine the color value of each pixel representing that grain;
  create a histogram of the color values of the plurality of grains identified from the determined color values;
  receive the histogram of the quantity of grains at the parametric evaluator;
  determine whether the histogram falls within an expected histogram parameter;
  receive the moisture data from the humidity sensor;
  determine whether the moisture data falls within an expected moisture parameter; and
  if the histogram falls within the expected histogram parameter and the moisture data falls within the expected moisture parameter, indicate acceptability of the quantity of grains;
  if the parametric evaluator has not indicated acceptability of the quantity of grains, receive the histogram at the hierarchical histogram evaluator; and
  compare the histogram to a hierarchy of histograms to identify an abnormality in the quantity of grains that is the cause of unacceptability.

* * * * *